(12) United States Patent
Hans et al.

(10) Patent No.: US 12,554,606 B2
(45) Date of Patent: Feb. 17, 2026

(54) RESILIENCY TESTING OF APPLICATIONS AND COMPUTE INFRASTRUCTURES

(71) Applicant: International Business Machines Corporation, Armonk, NY (US)

(72) Inventors: Sandeep Hans, New Delhi (IN); Mudit Verma, New Delhi (IN); Samuel Solomon Ackerman, Haifa (IL); Diptikalyan Saha, Bangalore (IN); Eitan Daniel Farchi, Pardes Hana (IL); Praveen Jayachandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 18/202,079

(22) Filed: May 25, 2023

(65) Prior Publication Data
US 2024/0394162 A1    Nov. 28, 2024

(51) Int. Cl.
*G06F 11/00* (2006.01)
*G06F 11/263* (2006.01)

(52) U.S. Cl.
CPC .................... *G06F 11/263* (2013.01)

(58) Field of Classification Search
CPC .. G06F 11/263; G06F 11/0793; G06F 11/079; G06F 11/0781; G06F 11/1048; G06F 11/3608; G06F 11/3672; G06F 11/3696; G06F 11/3692; G06F 11/3688; G06F 11/3684
See application file for complete search history.

(56) References Cited

U.S. PATENT DOCUMENTS

| | | | |
|---|---|---|---|
| 10,684,940 B1 | 6/2020 | Kayal et al. | |
| 11,755,402 B1 * | 9/2023 | Chavan | G06F 11/3698 714/37 |
| 11,934,258 B1 * | 3/2024 | Kasaiezadeh Mahabadi | G06F 11/079 |
| 2006/0271825 A1 * | 11/2006 | Keaffaber | G06F 11/3688 714/E11.207 |

(Continued)

FOREIGN PATENT DOCUMENTS

CN    113935178 A    1/2022

OTHER PUBLICATIONS

Hernandez-Serrato et al., "Applying Machine Learning with Chaos Engineering," IEEE International Symposium on Software Reliability Engineering Workshops (ISSREW), 2020, pp. 151-152.

(Continued)

*Primary Examiner* — Katherine Lin
(74) *Attorney, Agent, or Firm* — Zilka-Kotab, P.C.

(57) ABSTRACT

A computer-implemented method, according to one embodiment, includes: intentionally causing faults to be injected in a compute infrastructure, and determining whether the injected faults cause application failures. Weights are also assigned to the injected faults based on severity of the respective application failures. The weighted faults are compared, and changes to the compute infrastructure are recommended based on the comparison. Moreover, the changes that are recommended are configured to prevent the application failures. Other systems, methods, and computer program products are described in additional embodiments.

17 Claims, 5 Drawing Sheets

(56) References Cited

U.S. PATENT DOCUMENTS

| | | | |
|---|---|---|---|
| 2011/0239048 A1* | 9/2011 | Andrade | G06F 11/28 |
| | | | 714/E11.178 |
| 2017/0242784 A1 | 8/2017 | Heorhiadi et al. | |
| 2019/0149622 A1 | 5/2019 | Kumar et al. | |
| 2022/0231904 A1 | 7/2022 | Di Martino | |

OTHER PUBLICATIONS

Basiri et al., "Automating chaos experiments in production," arXiv, 2019, 10 pages, retrieved from https://arxiv.org/pdf/1905.04648.pdf.

Zhang et al., "Chaos Engineering of Ethereum Blockchain Clients," arXiv, 2021, 14 pages, retrieved from https://arxiv.org/pdf/2111.00221.pdf.

Jernberg et al., "Getting Started with Chaos Engineering—design of an implementation framework in practice," Empirical Software Engineering and Measurement Conference (ESEM), Oct. 2020, 10 pages.

Torkura et al., "CloudStrike: Chaos Engineering for Security and Resiliency in Cloud Infrastructure," IEEE Access, vol. 8, Jul. 6, 2020, pp. 123044-123060.

Canonico et al., "Human-AI Partnerships for Chaos Engineering," IEEE/ACM 42nd International Conference on Software Engineering Workshops (ICSEW), 2020, pp. 499-053.

Anonymous, "Principles of chaos engineering," Last update Mar. 2019, 3 pages, retrieved from http://principlesofchaos.org/.

"Middleware", 24th ACM/IFIP International Middleware Conference, Dec. 11-15, 2023, 03 pages, https://middleware-conf.github.io/2023/.

* cited by examiner

RESILIENCY TESTING OF APPLICATIONS AND COMPUTE INFRASTRUCTURES

BACKGROUND

The present invention relates to application testing, and more specifically, this invention relates to testing the resiliency of an application and/or compute infrastructure.

One aspect of developing a system having compute capabilities (also referred to herein as a compute infrastructure) involves determining whether the system will operate under a variety of different scenarios. For instance, different combinations of system settings, user preferences, instructions received, etc., may impact the system's ability to operate successfully. Thus, while a compute system may be designed with broad functionality, applications that run on the compute system are sometimes limited by the physical constraints of the system. Accordingly, it is also desirable that software be tested on a system before being implemented.

SUMMARY

A computer-implemented method, according to one embodiment, includes: intentionally causing faults to be injected in a compute infrastructure, and determining whether the injected faults cause application failures. Weights are also assigned to the injected faults based on severity of the respective application failures. The weighted faults are compared, and changes to the compute infrastructure are recommended based on the comparison. Moreover, the changes that are recommended are configured to prevent the application failures.

A computer program product, according to another embodiment, includes a computer readable storage medium having program instructions embodied therewith. The program instructions are readable by a processor, executable by the processor, or readable and executable by the processor, to cause the processor to perform the foregoing method.

A system, according to yet another embodiment, includes: a processor, and logic integrated with the processor, executable by the processor, or integrated with and executable by the processor. The logic is configured to perform the forging method.

Other aspects and embodiments of the present invention will become apparent from the following detailed description, which, when taken in conjunction with the drawings, illustrate by way of example the principles of the invention.

DETAILED DESCRIPTION

Figure 1:
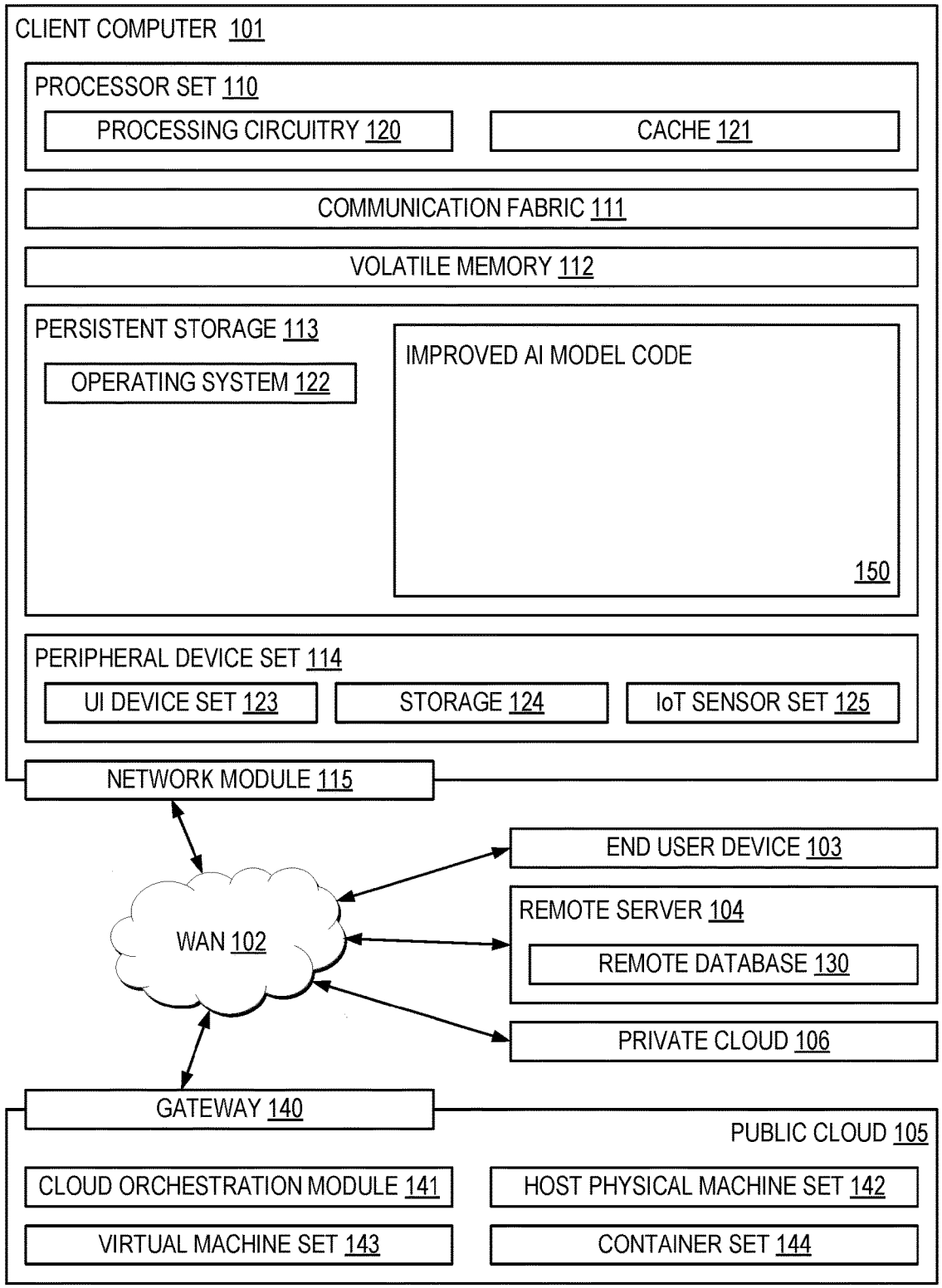
FIG. 1 is a diagram of a computing environment, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for testing the resiliency of an application and/or compute infrastructure. For instance, implementations herein include models that are able to generate specific combinations of faults to inject in a system that confirm performance in situations involving certain operational settings. The models are even able to dynamically update the combinations of faults that are generated for implementation in the testing procedure based on pasts performance. Models implemented herein may also be able to generate recommendations on how a system and/or software can be improved, e.g., as will be described in further detail below.

In one general embodiment, a computer-implemented method includes: intentionally causing faults to be injected in a compute infrastructure, and determining whether the injected faults cause application failures. Weights are also assigned to the injected faults based on severity of the respective application failures. The weighted faults are compared, and changes to the compute infrastructure are recommended based on the comparison. Moreover, the changes that are recommended are configured to prevent the application failures.

In another general embodiment, a computer program product includes a computer readable storage medium having program instructions embodied therewith. The program instructions are readable by a processor, executable by the processor, or readable and executable by the processor, to cause the processor to: perform the foregoing method.

In yet another general embodiment, a system includes: a processor, and logic integrated with the processor, executable by the processor, or integrated with and executable by the processor. The logic is configured to: perform the forging method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved artificial intelligence (AI) model code of block 150 for to test the resiliency of an application and/or a system (e.g., compute infrastructure). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As noted above, an important aspect of developing a system having compute capabilities is determining whether the system will operate under a variety of scenarios. For instance, different combinations of system settings, user preferences, instructions received, etc., may impact the system's ability to operate successfully.

While a compute system may be designed with broad functionality, applications are sometimes limited by the physical constraints of the system. Accordingly, it is also desirable that software be tested on a system before being implemented in the system. This further improves the reliability of the system, reduces errors for applications running on the system, and can even improve the operating efficiency of the system, e.g., as described in further detail below.

Embodiments herein accomplish these improvements by evaluating performance of a system and/or application while varying operating settings of the system and/or application thereon, in a controlled manner. For instance, AI models may be developed (e.g., trained) over time that are able to generate a more complex and through array of testing than conventionally achievable.

These models are able to find and evaluate error prone areas in systems or applications, identify bottlenecks in the systems and/or applications, locate dependencies, etc. The models are further able to recommend changes to systems, applications, or both, that achieve an improved level of performance for the systems as well as the applications. Again, this has not been conventionally achievable due to physical limitations of previous implementations, particularly those requiring manual manipulation for testing. The limitations of these conventional implementations are particularly noticeable as complexity of compute systems and software (e.g., applications) increases.

Figure 2:
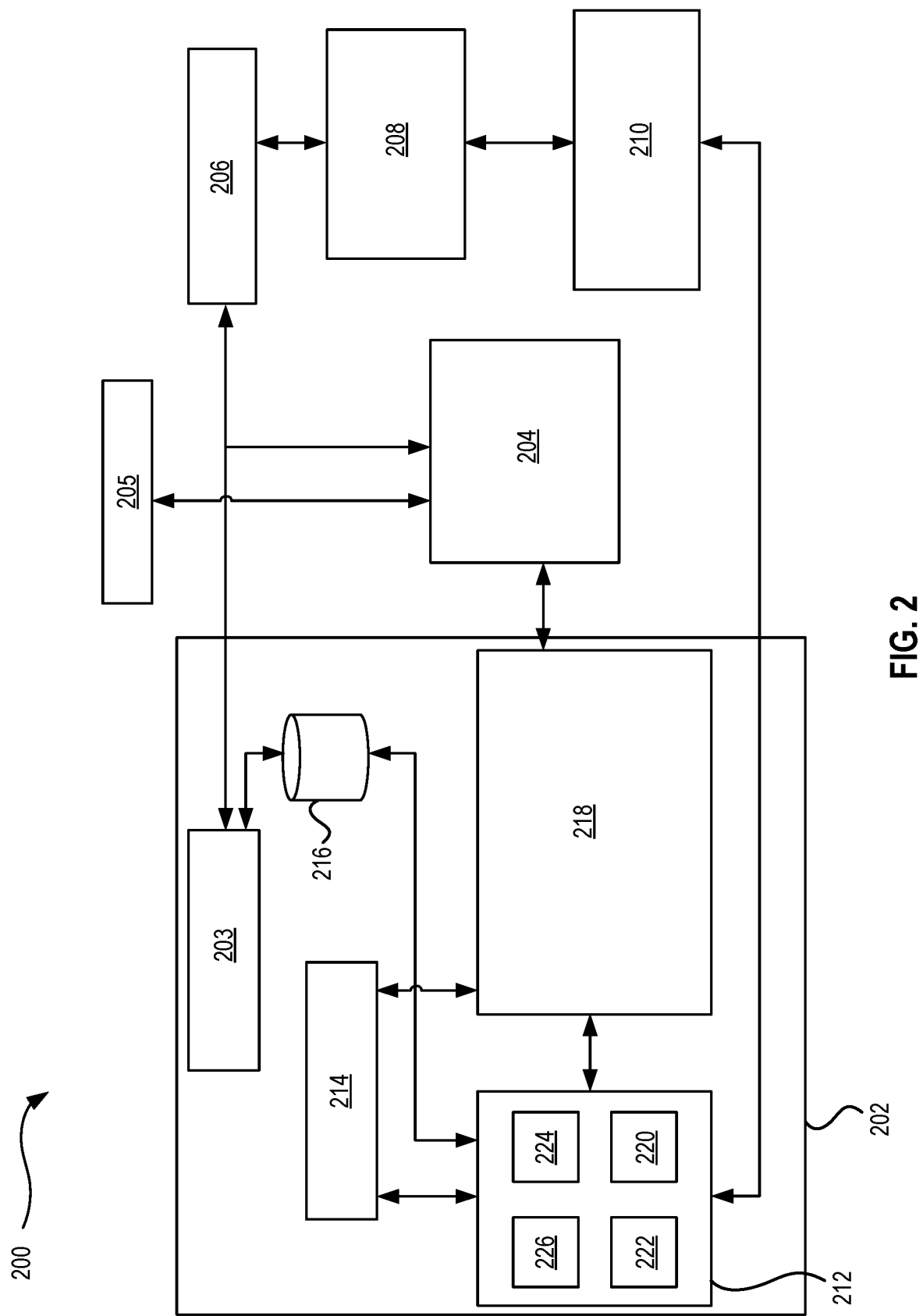
FIG. 2 is a partial representational view of a system, in accordance with one embodiment.

Now referring to FIG. 2, a system 200 is shown according to one embodiment. As an option, the present system 200 may be implemented in conjunction with features from any other embodiment listed herein, such as those described with reference to the other FIGS., such as FIG. 1. However, such system 200 and others presented herein may be used in various applications and/or in permutations which may or may not be specifically described in the illustrative embodiments listed herein. Further, the system 200 presented herein may be used in any desired environment. Thus FIG. 2 (and the other FIGS.) may be deemed to include any possible permutation.

As shown, system 200 includes a testing module 202 that is coupled to a compute infrastructure 204. The testing module 202 is thereby able to communicate with the compute infrastructure 204. Depending on the approach, the testing module 202 is thereby able to send various commands, instructions, faults, requests, etc. to the compute infrastructure 204. Similarly, the compute infrastructure 204 is able to send data, metadata, responses, requests, etc. to the testing module 202.

According to some implementations, the testing module 202 may intentionally send instructions to implement one or more faults in the compute infrastructure 204. In other words, the testing module 202 may intentionally subject the compute infrastructure 204 to strain, unnatural situations, etc., to test how the compute infrastructure 204 performs. Moreover, by implementing (e.g., running) applications, programs, instructions, etc., or any type of software in the compute infrastructure 204 while intentionally injecting the one or more faults thereto, approaches herein are also able to determine how software performs in a variety of different situations.

For example, any one or more of the operations described below in method 300 of FIG. 3A may be implemented in order to test the resiliency of an application on a system, e.g., as would be appreciated by one skilled in the art after reading the present description. It should also be noted that with respect to the present description, any of the components included in system 200 may be "coupled" to each other using wired and/or wireless connections depending on the implementation. For instance, some components may be coupled to each other using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. The number of components and/or their configuration depicted in FIG. 2 is also in no way intended to be limiting.

Looking to FIG. 2, the testing module 202 and compute infrastructure 204 are also depicted as being coupled (at least indirectly) to an observability module 206, a cloud management module 208, and a fingerprinting module 210. The compute infrastructure 204 is also coupled to a traffic management module 205. The traffic management module 205 may assist the compute infrastructure 204 operate, e.g., at least to some extent. For example, the traffic management module 205 may actually serve as a queue that stores one or more operations for the compute infrastructure 204 to perform.

The observability module 206 may receive information from an analytics module 203 of the testing module 202 and/or directly from the compute infrastructure 204. Depending on the approach, the information received at the observability module 206 can include logs, metrics, traces, etc. The analytics module 203 may also receive information directly from the observability module 206, e.g., such as telemetry data. This may be used by the analytics module 203 to perform fault realism using processes including application behavior analysis, incident analysis, etc., e.g., as would be appreciated by one skilled in the art after reading the present description.

The observability module 206 is preferably configured to infer status results based on the information received. In other words, the observability module 206 may be able to deduce the status of a system implementing an application. This status information may be used to better understand performance of software based on the physical configurations of the (compute) system executing the software. Depending on the implementation, the observability module 206 may implement any desired type of observability program to achieve the desired level of insight into the system being evaluated.

The cloud management module 208 is preferably able to deploy and maintain robust private clouds for various implementations, e.g., such as virtual machine training, container-based application testing, etc. By providing private clouds depending on the use, the cloud management module 208 is able to avoid the high prices and complex access procedures experienced by conventional products, e.g., as would be appreciated by one skilled in the art after reading the present description.

According to an in-use example, which is in no way intended to limit the invention, the cloud management module 208 may include various components and/or sub-processes, e.g., such as log comprehension, memory management, event deduplication, fault localization, and metric management. From the cloud management module 208, information is sent to the fingerprinting module 210, as alluded to above.

The fingerprinting module 210 is further used to perform some level of authentication on the information and may include a number of components and/or sub-processes to do so. For instance, the fingerprinting module 210 may be able to implement fingerprint representation, action orchestration, fingerprint editing, fingerprint matching, or any other desired type of functionality.

From the fingerprinting module 210, information is transferred to the testing module 202. It follows that in some approaches, only information that has been verified by the fingerprinting module 210 may actually be evaluated by the testing module 202. In other approaches, the fingerprinting module 210 may be used to mark the information input into the testing module 202. The marked information input and/or any information received as a result may be used to train machine learning modules.

As shown, AI module 212 receives information from the fingerprinting module 210, as well as from a number of other locations. For instance, the AI module 212 is able to communicate with a combinatorial test design (CTD) module 214, memory 216, and a fault injection component 218.

At least some of the information returned to the AI module 212 may be stored in memory 216. Accordingly, the AI module 212 may utilize memory 216 as backup storage for any of the faults injected and/or errors (e.g., application failures) experienced. The information saved in memory 216 may thereby be used to train various models in a supervised, unsupervised, semi-supervised, etc. manner.

It follows that the AI module 212 is able to receive information from each part of the testing module 202 and/or the system 200 as a whole. For instance, different faults may be implemented at the compute infrastructure 204, each fault impacting performance differently. This performance information can thereafter be relayed to the fault injection component 218. The fault injection component 218 may be able to process the performance information and determine related information, e.g., such as details associated with which one or more of the injected faults caused an error that was experienced. The fault injection component 218 may include any desired programs, toolkits (e.g., chaos toolkit), interfaces and/or Application Programming Interfaces, libraries (e.g., Wollfi Library), fault injection (e.g., probes), etc.

The information returned to the AI module 212 from the fault injection component 218 may thereby indicate outcomes (e.g., results) experienced by the compute infrastructure 204 as a result of injecting faults while testing software performance in a given implementation. In other approaches, information corresponding to errors experienced at the compute infrastructure 204 as a result of injecting one or more faults may be processed by the AI module 212 itself. As noted above, the AI module 212 may be trained using one or more sources of data, e.g., which correspond to previous implementations.

The AI module 212 may thereby be trained over time as the compute infrastructure 204 operates in a variety of different settings and under a variety of different constraints (e.g., faults). For instance, one or more AI models may be trained and implemented to broaden the scope of testing performed on systems and software. Techniques including reinforcement learning, association mining, using a feedback mechanism, etc., can be used to identify and test faults in a system, explore bottlenecks and dependencies in the system and recommend improvements based on the fault analysis, e.g., as described in further detail below.

The AI module 212 also includes a number of components (e.g., sections), any of which may be implemented in the process of training and/or maintaining AI models. It follows that one or more of the components included in AI module 212 may be used in the process of performing method 300 of FIG. 3A below.

Referring still to FIG. 2, the AI module 212 includes a reinforcement learning section 220. This section 220 may be used to implement a machine learning training method based on rewarding desired behaviors and/or punishing undesired ones. In general, a reinforcement learning agent is able to perceive and interpret its environment, take actions and learn through trial and error. Thus, the reinforcement learning section 220 may implement rewards or other aspects that improve training.

The AI module 212 also includes a score computation section 222, a fault selection section 224, and a sequence mining section 226. As described herein, a score may be computed for each set of faults injected into a system, the score being based on the outcome and distribution difference of microservice internal calls. A heat-map may even be created for the scores based on how dramatic their influence was in changing observed system behavior, e.g., as compared to a baseline.

The score computation section 222 is thereby able to provide valuable information which is used to make additional determinations. For instance, fault selection section 224 may work with the sequence mining section 226 to identify specific faults to inject during testing of a system and/or application. Changes to the system and/or application configured to eliminate errors may also be suggested, e.g., as described in further detail below.

Once trained, the AI module 212 may be able to implement one or more models (machine learning models, neural networks, etc.) that can generate specific sets of infrastructure faults to implement in the system 200 in order to test software programs (e.g., applications) in specific settings. As noted above, the testing module 202 may intentionally subject the compute infrastructure 204 to strain, unnatural situations, etc., to test how the compute infrastructure 204 performs. Moreover, by implementing (e.g., running) applications, programs, instructions, etc., or any type of software in the compute infrastructure 204 while intentionally injecting the one or more faults thereto, approaches herein are also able to determine how software performs in a variety of different situations. The AI module 212 may also be able to dynamically update the suggested sets of faults to implement, e.g., based on actual performance of the system and/or applications.

As the AI module 212 is trained, it also develops an understanding of what changes can be made to the system and/or applications being tested in order to correct the errors that are experienced. The AI module 212 "learns" through testing of a system and/or application that it fails under certain settings that correspond to a particular aspect of the system and/or application. For example, the AI module 212 may compute a score for each set of faults injected into the system, the score being based on the outcome and distribution difference of microservice internal calls. A heat-map may even be created for the scores based on how dramatic their influence was in changing observed system behavior, as compared to a fault-free baseline. The AI module 212 is thereby preferably able to use this information to suggest changes to the system and/or application configured to eliminate the errors, e.g., as will soon become apparent.

Figure 3A:
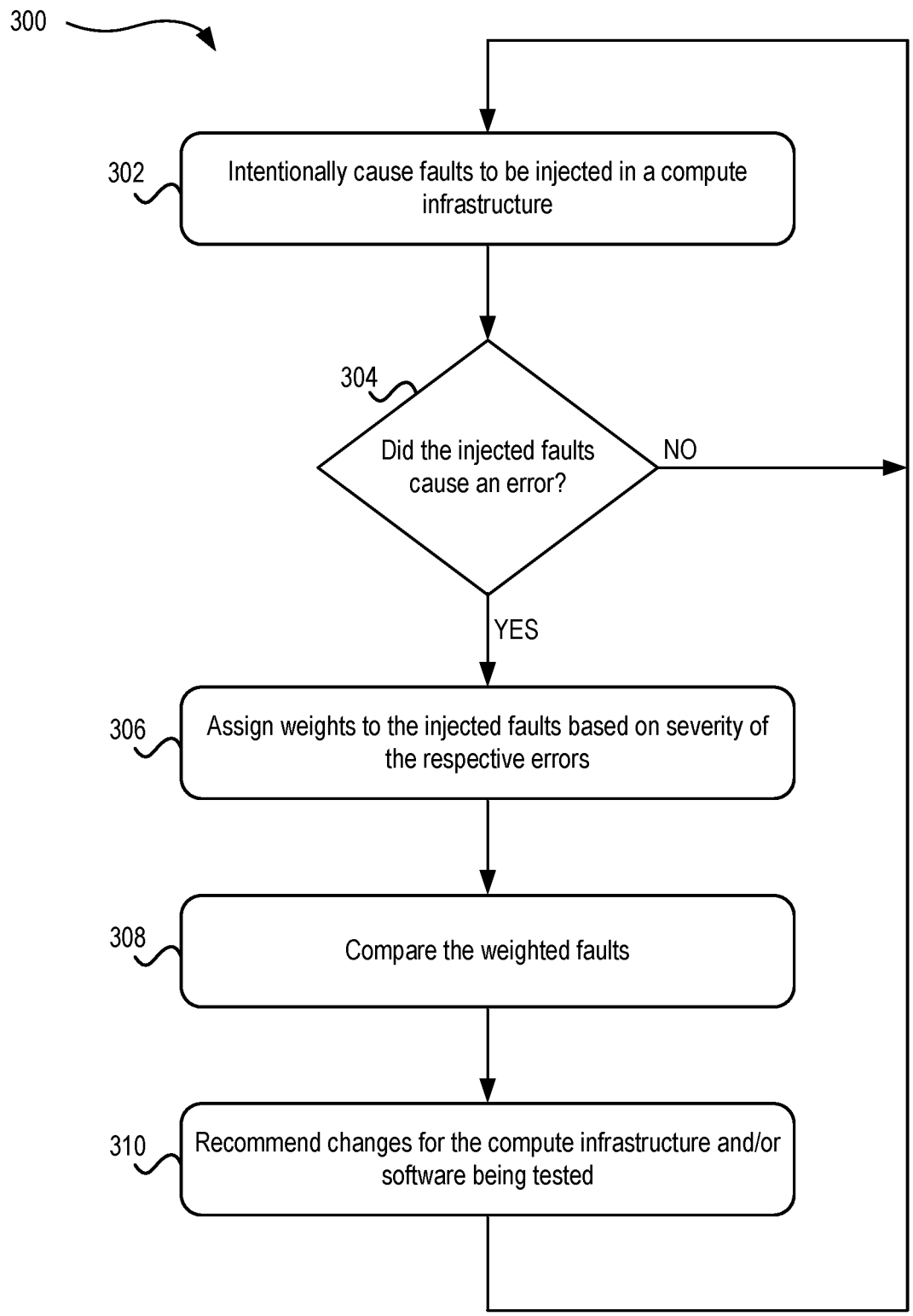
FIG. 3A is a flowchart of a method, in accordance with one embodiment.

Referring now to FIG. 3A, any one or more of the operations described below in method 300 may be implemented in order to test the resiliency of an application on a system (e.g., compute infrastructure). For example, any one or more of the operations may be deployed at a cloud location by selecting and injecting sets of infrastructure faults and specific parameters based on the outcomes of previous iterations.

The method 300 may be performed in accordance with the present invention in any of the environments depicted in FIGS. 1-2, among others, in various embodiments. Of course, more or less operations than those specifically described in FIG. 3A may be included in method 300, as would be understood by one of skill in the art upon reading the present descriptions.

Each of the steps of the method 300 may be performed by any suitable component of the operating environment. For example, in various embodiments, the method 300 may be partially or entirely performed by an AI module (e.g., see AI module 212 in FIG. 2). In other implementations one or more of the operations may be performed by a controller, a processor, a computer, etc., or some other device having one or more processors therein. Thus, in some embodiments, method 300 may be a computer-implemented method. Moreover, the terms computer, processor and controller may be used interchangeably with regards to any of the embodiments herein, such components being considered equivalents in the many various permutations of the present invention.

For those embodiments having a processor, the processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3A, operation 302 of method 300 includes intentionally causing faults to be injected in a compute infrastructure. As noted above, intentionally subjecting a compute infrastructure (e.g., system) to certain faults allows for the infrastructure to be functionally tested in a number of different situations. Software such as applications can also be run on the infrastructure while the faults are injected, thereby testing the software under a variety of situations as well.

The faults that are injected into the system are selected to produce specific operating conditions therein. The order, number, type, etc., of faults that are injected is also selected to improve testing efficiency. For instance, an AI module (e.g., see AI module 212 of FIG. 2) may implement one or more models that have been trained using the operating settings of the system and the corresponding results achieved over time. For example, the models are trained to generate (e.g., identify) potential changes to the compute infrastructure configured to improve performance, the potential changes being based on (i) faults injected into the compute infrastructure, and (ii) performance of the compute infrastructure and application(s) implemented therein, in response to injecting the faults.

It follows that the models can generate specific combinations of faults to inject in the system subject the system and/or any software implemented on the system to certain operational settings. The AI module is even able to dynamically update the combinations of faults that are generated for implementation in the testing procedure based on pasts performance. Thus, the faults that are injected in a compute infrastructure may also be selected based on faults previously injected in the compute infrastructure and/or corresponding performance of the compute infrastructure. This dynamic approach allows the AI module to avoid testing certain settings that correspond to predictable results. For example, the AI module may be able to identify the minimum number of faults that cause a system and/or application error. This allows for the source of an error to be identified and resolved in a shorter amount of time, compared to more complex combinations of faults that cause the same error. In another example, the AI module may be able to identify which faults occur most frequently, least frequently, etc.

Combinations of faults implemented may also be determined based on user input, predetermined settings, industry standards, etc. The type(s) of faults that are injected in a compute infrastructure may vary depending on the implementation. For instance, the type of compute infrastructure and/or application being run on the compute infrastructure may impact the types of faults that are injected. An illustrative list of faults includes, but is not limited to, system errors (e.g., "500", "404", etc.); fault codes (e.g., "terminate_pod", "cpu_hog", "network_delay", etc.); test workloads; application topologies; key performance indicators (e.g., at least 10% requests return status code "500"); etc. It follows that any adjustments may be made to the system to produce a desired operational environment.

With continued reference to FIG. 3A, method proceeds to operation 304. There, operation 304 includes determining whether the injected faults caused one or more errors. In other words, operation 304 includes determining whether the faults intentionally injected in the system resulted in any application failures, and/or any other negative effects on performance of the system as a whole. Other details about errors experienced may also be taken into consideration. For instance, the number, severity, type, etc., of errors experienced may be evaluated to identify specific details about how a system and/or application operates.

As shown, method 300 returns to operation 302 in response to determining that the injected faults did not cause any application failures. This allows for a different set of faults to be implemented before repeating the performance evaluation. It follows that operations 302 and 304 may be repeated in an iterative fashion for a variety of faults that do not cause errors.

Although not specifically illustrated in FIG. 3A, it should be noted that the weight (e.g., value) assigned to a given set of faults applied to a system and/or application may be reduced in response to determining that the set of faults did not cause any errors to be experienced. In other words, the weight assigned to a given set of injected faults is reduced in response to determining that the set of faults did not cause any application failures. This allows the implementations described herein to improve performance of the application. Therefore, even if a set of faults do not cause any errors, improvements to performance of the application may still be achieved.

With continued reference to FIG. 3A, method 300 proceeds to operation 306 from decision 304 in response to determining that the injected faults caused at least one application failure. There, operation 306 includes assigning weights to the injected faults based on severity of the respective errors (e.g., application failures). As noted above, the severity of the failures experienced may impact what (if anything) is done in some implementations. Accordingly, by quantifying the negative impact particular faults have on a system and/or application based on the outcome and distribution difference of microservice internal calls, approaches herein are able to improve system performance in further detail.

Figure 3B:
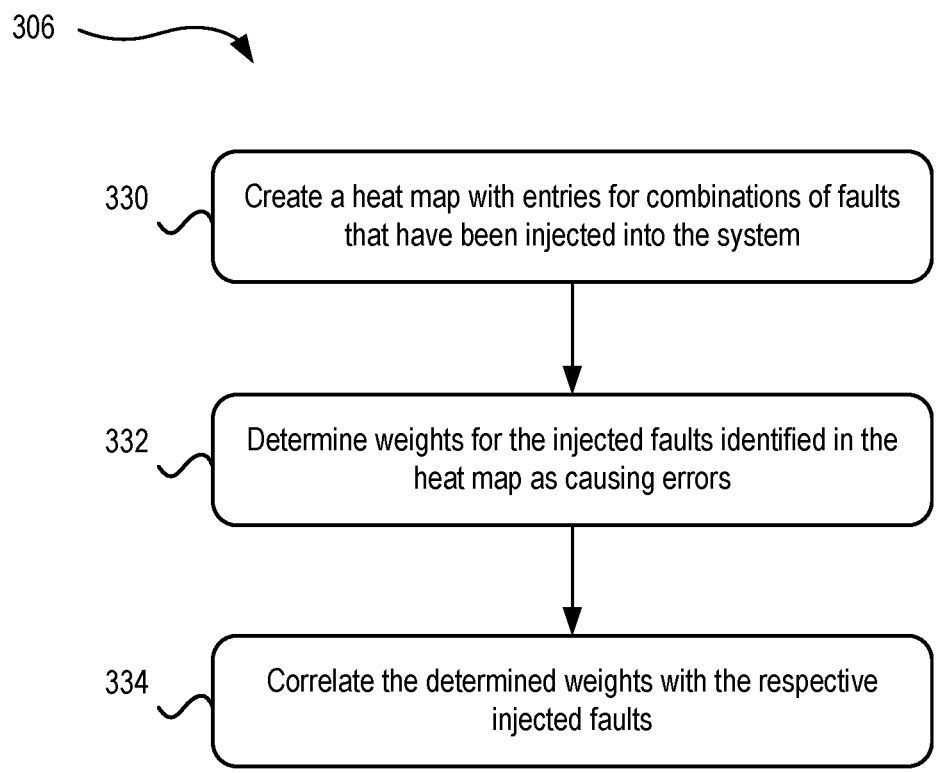
FIG. 3B is a flowchart of sub-operations for one of the operations in the method of FIG. 3A, in accordance with one embodiment.

Referring momentarily to FIG. 3B, exemplary sub-operations of assigning weights to faults injected in a system are illustrated in accordance with one embodiment, one or more of which may be used to perform operation 306 of FIG. 3A. However, it should be noted that the sub-operations of FIG. 3B are illustrated in accordance with one embodiment which is in no way intended to limit the invention.

As shown, sub-operation 330 includes creating a heat map with entries for different combinations of faults injected into the system. The heat map preferably includes an entry for each combination of faults that has been injected into the system. Each entry in the heat map preferably indicates the combination of faults it corresponds to. This may be done using one or more flags, metadata, header information, etc. The heat map is also preferably large enough to incorporate additional faults that are injected over time. It follows that the size and/or style of heat map created may vary depending on the implementation. The size of the heat map may even change over time.

The heat map also preferably indicates whether each combination of faults resulted in an error being experienced. In other words, each heat map entry preferably indicates whether an application and/or system error was experienced as a result of intentionally injecting the corresponding one or more faults. Additional information may also be represented in the heat map.

For instance, operation 332 includes determining weights for the injected faults identified in the heat map as causing errors (e.g., application failures), while operation 334 includes correlating the determined weights with the respective injected faults. Again, different combinations of faults can cause errors, making the types of errors that are experienced vary also. It follows that, while an error may be associated with a failure occurring in a physical system and/or logical application, the type of failure experienced may vary depending on the situation.

The seriousness (e.g., severity) of an error experienced impacts the weight assigned to the respective faults that were originally injected to produce the error. In some approaches, the weights are determined based on the outcome and distribution difference of microservice internal calls. Moreover, the weight assigned to an injected set of faults may be determined based, at least in part on, the amount of time the corresponding error was experienced. Preferably, the weight assigned to a set of faults increases as the amount of time the error was experienced increases as well, but this is in no way intended to be limiting.

As noted above, the weight assigned to a given set of faults applied to a system and/or application may be reduced in response to determining that the set of faults did not cause any errors to be experienced. In other words, the weight assigned to a given set of injected faults is reduced in response to determining that the set of faults did not cause any application failures. This allows the implementations described herein to improve performance of the application. Therefore, even if a set of faults do not cause any errors, improvements to performance of the application may still be achieved.

In some situations, the weight assigned to a given entry in the heat map may actually be a negative value. For instance, assigning weights to the injected faults includes assigning a negative weight to injected faults that cause a change to compute infrastructure behavior, but which do not cause an application error. Moreover, the weight may be more negative as the impact on the compute infrastructure increases, and less negative (closer to zero) as the impact on the compute infrastructure decreases. According to an example, which is in no way intended to limit the invention, errors that correspond to e-commerce cart services are less impactful than errors experienced with payment services. Accordingly, an error that involves payment services may be assigned a higher weight than an error experienced with cart services, e.g., as would be appreciated by one skilled in the art after reading the present description.

Injected faults that produce no changes to the compute infrastructure and/or applications running thereon may also be assigned a negative weight value. Some entries may be assigned a weight of zero to normalize the value, or even ignore the value in some instances. This may be applied to injected faults that produce inconclusive results or which failed to be implemented.

The process of determining the weight for a particular entry in the heat map may include calculating the occurrence probability of each microservice in the system, under both a baseline and a chaos situation. In other words, the occurrence probability is calculated for different situations. The effect one or more faults has on the system can thereby be measured by the statistical distance between the baseline and chaos system behavior probabilities. This is because a fault that had a limited impact on the system or application under the baseline situation may have an increased impact under a variety of chaos settings.

It should be noted that the weights assigned to the various heat map entries may also be used to determine a reward. This reward may be used in training an AI model that is used to intentionally inject various sets of faults and parameters in a system for testing, the sets of faults being based at least partially on the outcome of previously injected faults as described in various implementations herein. It follows that the operations and sub-operations of FIGS. 3A-3B are able to train and implement AI models that are configured to improve the efficiency by which systems and applications operate.

Returning now to FIG. 3A, method 300 proceeds from operation 306 to operation 308. There, operation 308 includes comparing the weighted faults determined in operation 306. In other words, operation 308 includes comparing the impact each set of faults had on performance. Combinations of injected faults that had the biggest impact on performance may be identified and evaluated further.

As a result of this comparison performed in operation 308, changes are recommended for the compute infrastructure and/or software being tested. See operation 310. The recommended changes are specifically configured to prevent (or avoid) the application failures identified in operation 304 and/or previous iterations of operation 304. Accordingly, the changes recommended in operation 310 are able to improve the computational efficiency of the physical system by improving the compute infrastructure, but also the operational efficiency of applications by incrementally improving the operational aspects of the underlying software. These improvements to the application further cause improvements to the performance of a compute infrastructure implementing the improved application.

The comparison in operation 308 and/or the recommended changes generated in operation 310 may be performed, at least in part, using AI models. For instance, one or more AI models (machine learning models, neural networks, linear regression, etc.) may be trained to propose changes to a system and/or application that are able to improve the efficiency of the system and the application. As noted herein, AI models may be trained over time using organic use data, pools of labeled training data, pools of unlabeled training data, past use data, etc.

As the AI models are trained, they develops an understanding of what changes can be made to the system and/or applications being tested in order to correct the errors that are experienced. The AI models "learn" through testing a system and/or application under a variety of settings by injecting different faults into the compute infrastructure. The faults that are injected, in combination with the resulting performance of the compute infrastructure and application, are used to train the AI models. The AI models are thereby able to use this understanding to generate suggested changes to the system and/or application that are configured to eliminate application errors.

Once trained, the AI models may be able to generate specific changes (e.g., improvements) to a system and/or applications being run on the system that are able to improve performance when implemented. The AI models may also be able to dynamically update the suggested changes, e.g., based on actual performance of the system and/or applications.

In some implementations, the changes recommended in operation 310 are automatically implemented to further improve performance. In other implementations, the recommended changes are implemented after receiving approval from a user, administrator, service provider, etc. In still other approaches, certain changes may be automatically implemented, while others involve satisfying a security protocol before implementation. For example, changes to power consumption settings may have a low threat of manipulation and are implemented automatically, while changes to authentication procedures may be approved by an application designer before being implemented. It follows that the recommended changes may be sent to any desired destination for confirmation, implementation, approval, etc.

From operation 310, method 300 returns to operation 302, such that the operations of FIG. 3A may be repeated. For instance, repeating operation 302 allows for a different set of faults to be intentionally injected in the compute infrastructure. In other words, by repeating the various operations of method 300 in an iterative fashion, the system and applications are tested in a variety of different situations. This improves training of AI models used herein, as well as actual performance of the system and applications.

It follows that the operations and sub-operations of FIGS. 3A-3B are able to identify specific sets of infrastructure faults that produce errors in the application and/or system. Approaches herein are thereby able to train and implement AI models that are configured to improve the efficiency by which systems and applications operate.

This is achieved, at least in part, by computing a score for each fault injected based on the outcome and distribution difference of microservice internal calls. Specific improvements to the infrastructure are also determined and recommended for implementation to avoid application failures.

Figure 4:
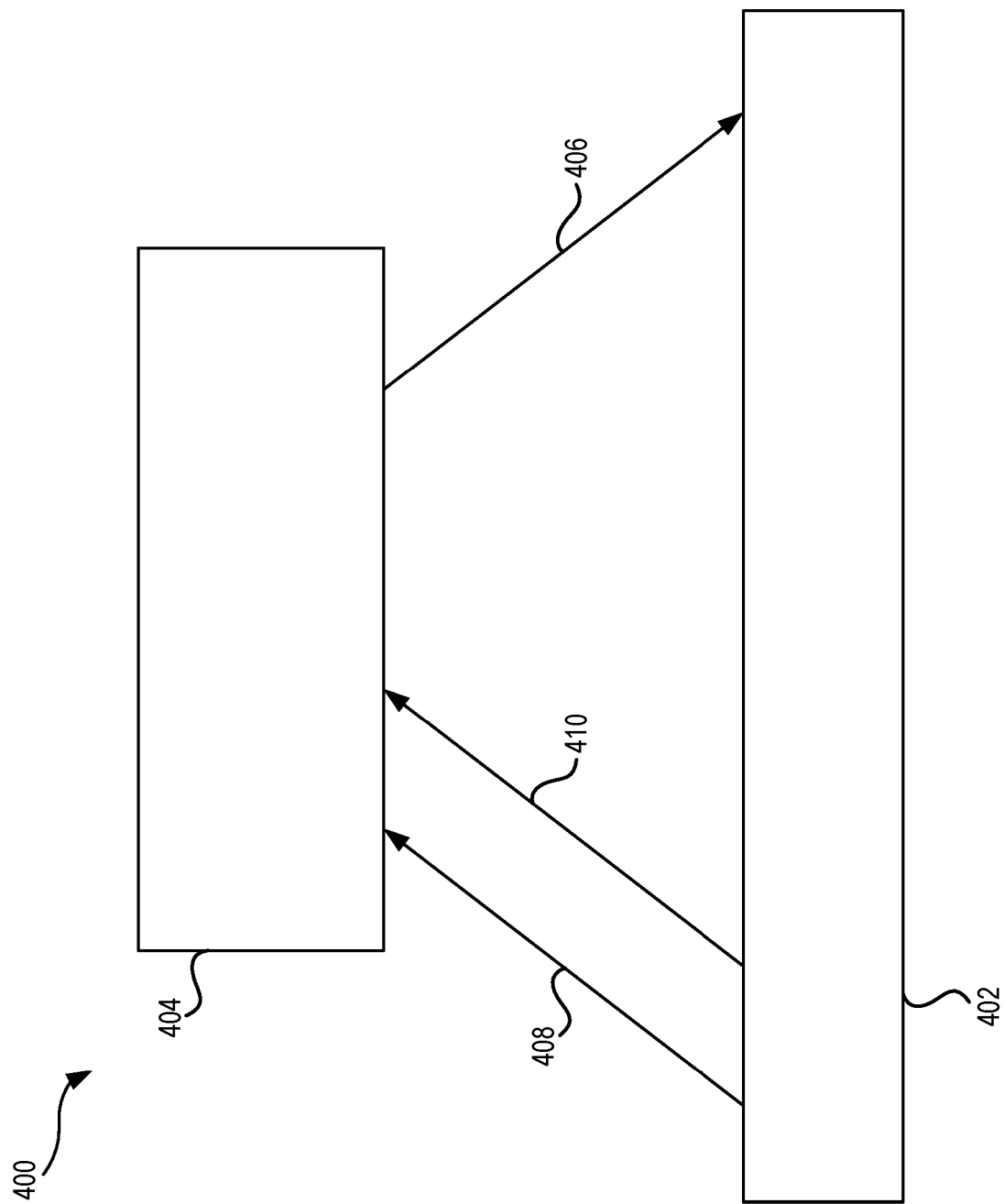
FIG. 4 is a partial representational view of an AI reinforcement learning model, in accordance with one embodiment.

As noted above, reinforcement learning may be implemented by an AI module to train one or more AI models. According now to an in-use example, which is in no way intended to limit the invention, FIG. 4 shows an AI reinforcement learning model 400, in accordance with one embodiment. As an option, the present model 400 may be implemented in conjunction with features from any other embodiment listed herein, such as those described with reference to the other FIGS., such as FIGS. 3A-3B. However, such model 400 and others presented herein may be used in various applications and/or in permutations which may or may not be specifically described in the illustrative embodiments listed herein. Further, the model 400 presented herein may be used in any desired environment. Thus FIG. 4 (and the other FIGS.) may be deemed to include any possible permutation.

As shown, the model 400 includes an environment 402 in which an application may be implemented. The model 400 also includes a chaos agent 404 that is in communication with the environment 402 and application implemented therein. The chaos agent 404 is able to generate different combinations of faults to intentionally inject into the environment 402 as represented by arrowed line 406. These combinations of faults are determined using AI models that have been trained on the environment 402 and/or application implemented therein.

In response to implementing the faults and evaluating performance, the environment 402 returns errors that occurred. See arrowed line 408. Again, these errors may be experienced by the system (compute infrastructure), applications running on the system, or both, depending on the situation. The environment 402 also returns rewards determined based on the errors and faults implemented. See arrowed line 410.

By repeating this process any desired number of times, the chaos agent 404 and environment 402 together are able to develop models that are able to improve the efficiency and thoroughness by which compute systems and applications are evaluated. These models are also able to improve the efficiency at which the systems and applications are able to operate as a result of implementing the faults instructed.

As noted above, rewards can be implemented in the process of training AI models. Equation 1 below may be used in some implementations to calculate the reward that corresponds to a given entry in a heat map.

$$\text{Reward} = \left(\sum_{i: R_i \geq 0} R_i\right) + (1 - w \times J(P_0, P_1)) \left(\sum_{i: R_i < 0} R_i\right) \quad \text{Equation 1}$$

Variables $P_0$ and $P_1$ represent the categorical distribution over sets of faults that that did not produce an error (e.g., application failure). Moreover, $R_i$ represents the reward for a given one of the fault sets. According to the present example, the reward $R_i$ has a negative value if the corresponding fault set did not result in an error, and a positive value if the fault set did cause an error.

With continued reference to Equation 1, J is the Jensen-Shannon distance, while w is a weight to cause a change in distribution, where w=0 produces the standard reward. However, rewards may be calculated differently depending on the implementation, e.g., depending on the desired amount of reinforcement.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   intentionally causing faults to be injected in a compute infrastructure;
   determining whether the injected faults cause application failures;
   assigning weights to the injected faults based on severity of the respective application failures, wherein a negative or zero weight is assigned to ones of the injected faults that cause a change to compute infrastructure behavior, and do not cause an application error;
   comparing the weighted faults;
   using an artificial intelligence (AI) model that has been trained to generate physical and/or logical changes to the compute infrastructure based at least in part on the comparison, the injected faults, and/or performance of the compute infrastructure and application(s) in response to the faults being injected, wherein the physical and/or logical changes are configured to prevent the application failures; and
   causing the physical and/or logical changes to be implemented in the compute infrastructure.

2. The computer-implemented method of claim 1, wherein assigning weights to the injected faults includes:
   creating a heat map having entries identifying whether respective ones of the injected faults cause application errors;
   determining weights for the injected faults identified in the heat map as causing application errors; and
   correlating the determined weights with the respective injected faults identified in the heat map as causing the application errors.

3. The computer-implemented method of claim 2, wherein the weights are determined based at least in part on an amount of time the application experienced respective errors, wherein the weights increase as the amount of time the compute infrastructure experiences respective errors increases.

4. The computer-implemented method of claim 3, wherein the injected faults include infrastructure faults that intentionally subject the compute infrastructure to strain.

5. The computer-implemented method of claim 2, wherein the weights are determined based on the outcome and distribution difference of microservice internal calls.

6. The computer-implemented method of claim 1, wherein the AI model is trained to generate the physical and/or logical changes to the compute infrastructure based on the comparison, the injected faults, and the performance of the compute infrastructure and application in response to injecting the faults.

7. The computer-implemented method of claim 1, wherein the injected faults are selected based on faults previously injected in the compute infrastructure, wherein the injected faults relate to parameters of the compute infrastructure, the parameters being selected from the group consisting of: system errors, fault codes, test workloads, application topologies, and key performance indicators.

8. A computer program product, comprising a computer readable storage medium having program instructions embodied therewith, the program instructions readable by a processor, executable by the processor, or readable and executable by the processor, to cause the processor to:
   intentionally cause faults to be injected in a compute infrastructure;
   determine whether the injected faults cause application failures;
   assign weights to the injected faults based on severity of the respective application failures, wherein a negative or zero weight is assigned to ones of the injected faults that cause a change to compute infrastructure behavior, and do not cause an application error;
   compare the weighted faults;
   use an artificial intelligence (AI) model that has been trained to generate physical and/or logical changes to the compute infrastructure based at least in part on the comparison, the injected faults, and/or performance of the compute infrastructure and application(s) in response to the faults being injected, wherein the physical and/or logical changes are configured to prevent the application failures; and cause the physical and/or logical changes to be implemented in the compute infrastructure.

9. The computer program product of claim 8, wherein assigning weights to the injected faults includes:
creating a heat map having entries identifying whether respective ones of the injected faults cause application errors;
determining weights for the injected faults identified in the heat map as causing application errors; and
correlating the determined weights with the respective injected faults identified in the heat map as causing the application errors.

10. The computer program product of claim 9, wherein the weights are determined based at least in part on an amount of time the application experienced respective errors.

11. The computer program product of claim 10, wherein the weights increase as the amount of time the compute infrastructure experiences respective errors increases.

12. The computer program product of claim 9, wherein the weights are determined based on the outcome and distribution difference of microservice internal calls.

13. The computer program product of claim 8, wherein the AI model is trained to generate the physical and/or logical changes to the compute infrastructure based on the comparison, the injected faults, and the performance of the compute infrastructure and application in response to injecting the faults.

14. The computer program product of claim 8, wherein the injected faults are selected based on faults previously injected in the compute infrastructure, wherein the injected faults are selected from the group consisting of: system errors, fault codes, test workloads, application topologies, and key performance indicators.

15. The computer program product of claim 14, wherein the injected faults relate to parameters of the compute infrastructure, the parameters being selected from the group consisting of: system errors, fault codes, test workloads, application topologies, and key performance indicators.

16. A system, comprising:
a processor; and
logic integrated with the processor, executable by the processor, or integrated with and executable by the processor, the logic being configured to:
intentionally cause faults to be injected in a compute infrastructure;
determine whether the injected faults cause application failures;
assign weights to the injected faults based on severity of the respective application failures, wherein a negative or zero weight is assigned to ones of the injected faults that cause a change to compute infrastructure behavior, and do not cause an application error;
compare the weighted faults;
use an artificial intelligence (AI) model that has been trained to generate physical and/or logical changes to the compute infrastructure based at least in part on the comparison, the injected faults, and/or performance of the compute infrastructure and application (s) in response to the faults being injected, wherein the physical and/or logical changes are configured to prevent the application failures; and
cause the physical and/or logical changes to be implemented in the compute infrastructure.

17. The system of claim 16, wherein
the AI model is trained to generate the physical and/or logical changes to the compute infrastructure based on the comparison, the injected faults, and the performance of the compute infrastructure and application in response to injecting the faults.

* * * * *